US008869217B2

(12) United States Patent
White

(10) Patent No.: US 8,869,217 B2
(45) Date of Patent: Oct. 21, 2014

(54) MEDIA FILES DELIVERY SYSTEM AND METHOD

(75) Inventor: Gregory C. White, Louisville, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 513 days.

(21) Appl. No.: 13/106,650

(22) Filed: May 12, 2011

(65) Prior Publication Data

US 2012/0291083 A1 Nov. 15, 2012

(51) Int. Cl.
*H04N 7/173* (2011.01)
*H04L 29/06* (2006.01)
*H04N 21/6405* (2011.01)
*H04N 21/6408* (2011.01)
*H04N 21/643* (2011.01)

(52) U.S. Cl.
CPC ...... *H04L 29/06462* (2013.01); *H04N 21/6405* (2013.01); *H04N 21/6408* (2013.01); *H04N 21/64322* (2013.01); *H04L 29/06244* (2013.01); *H04L 29/06517* (2013.01)
USPC ............................................. 725/93; 725/116

(58) Field of Classification Search
None
See application file for complete search history.

(56) References Cited

U.S. PATENT DOCUMENTS

| 8,276,180 | B1* | 9/2012 | Slavenburg et al. | 725/93 |
| 2003/0005457 | A1* | 1/2003 | Faibish et al. | 725/94 |
| 2006/0230176 | A1* | 10/2006 | Dacosta | 709/235 |
| 2007/0011709 | A1* | 1/2007 | Katz et al. | 725/87 |
| 2007/0130601 | A1* | 6/2007 | Li et al. | 725/112 |
| 2007/0162945 | A1* | 7/2007 | Mills | 725/119 |
| 2012/0222063 | A1* | 8/2012 | Mao et al. | 725/31 |

OTHER PUBLICATIONS

V. Roca, "FCAST: Scalable Object Delivery for the ALC and NORM Protocols," http://datatracker.ietf.org/doc/draft-ietf-rmt-fcast/, Nov. 9, 2010, 28 pages.
Adamson, et al., "NACK-Oriented Reliable Multicast (NORM) Transport Protocol," http://tools.ietf.org/search/rfc5740, May 10, 2011, 95 pages.
Cain, et al., "Internet Group Management Protocol, Version 3," http://tools.ietf.org/search/rfc3376, May 12, 2011, 54 pages.
Alex Zambelli, "IIS Smooth Streaming Technical Overview," Microsoft Silverlight, Windows Server, Internet Information Services 7.0, Microsoft Corporation, Mar. 9, 2009, 17 pages.
R. Pantos "HTTP Live Streaming draft-pantos-http-live-streaming-04," http://tools.ietf.org/html/draft-pantos-http-live-streaming-04, Nov. 9, 2010, 23 pages.

* cited by examiner

*Primary Examiner* — Brian T Pendleton
*Assistant Examiner* — Ryan Stronczer
(74) *Attorney, Agent, or Firm* — Davis Wright Tremaine LLP

(57) ABSTRACT

A file server delivers media files in unicast mode to a media gateway device in response to user requests, and a FCAST/NORM media streamer delivers a stream of these media files in multicast mode to the media gateway device. By using a file server operating in unicast mode and a FCAST/NORM media streamer delivering a stream of these media files in multicast mode, it is possible to switch seamlessly between the two modes in an embodiment. In an embodiment of the invention, a media gateway device includes a cache memory for storing media files from the file server and/or the FCAST/NORM media streamer; and a controller that controls delivery of media files from the cache memory to the user and transmits user requests for media files to the file server when the cache memory does not contain the media files requested by the user. Thus, the controller requests media files from the file server only when the media files requested by the user are not cached. Otherwise, the media files requested by the user are fetched from the cache memory for delivery to the user. In this manner, the media files requested by the user will be delivered by the file server in unicast mode only when the FCAST/NORM media streamer has not supplied such files to the gateway device for caching.

12 Claims, 3 Drawing Sheets

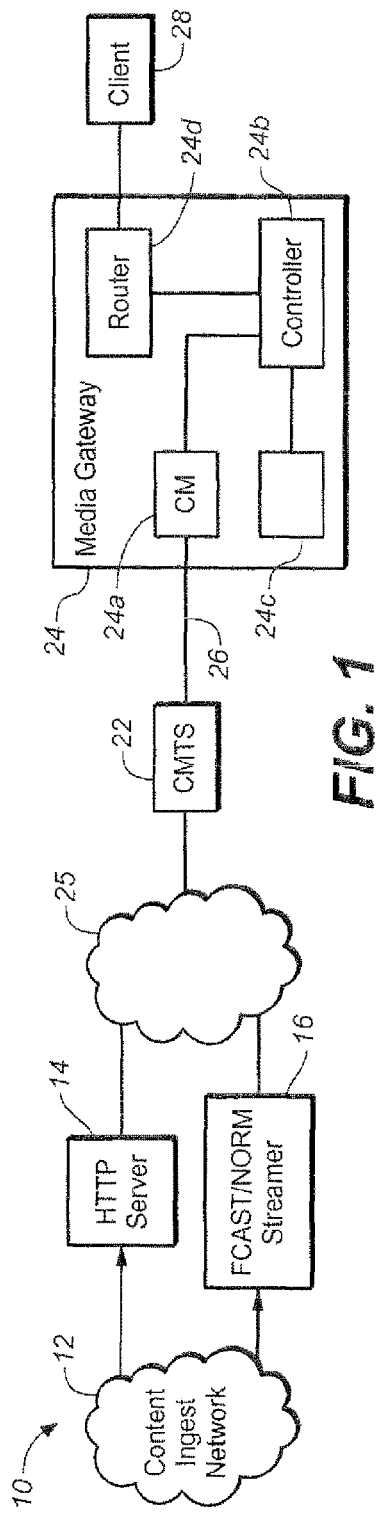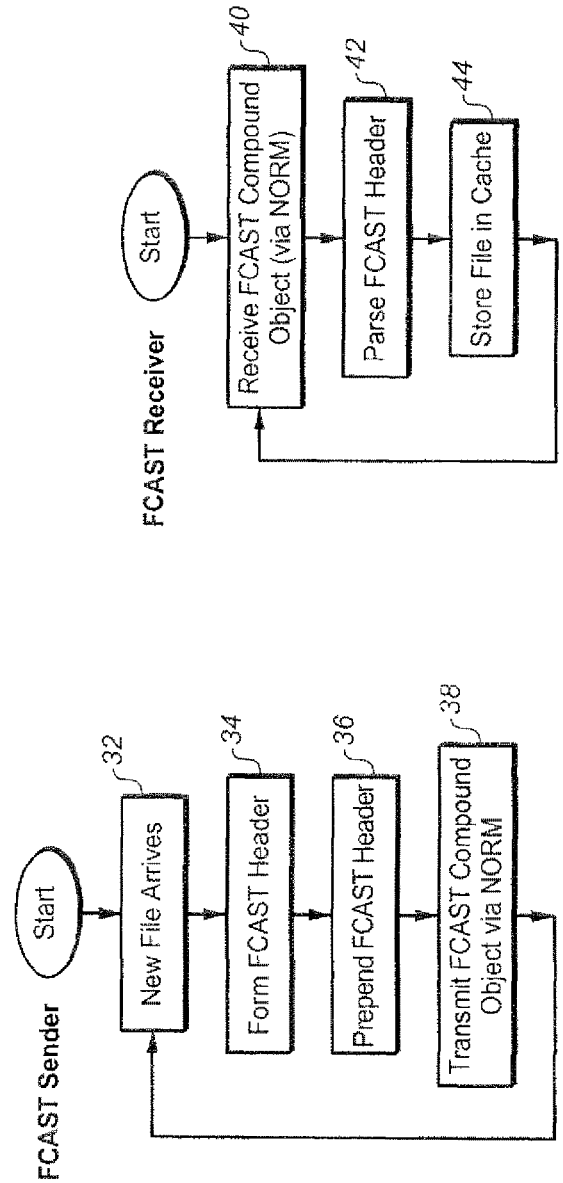

MEDIA FILES DELIVERY SYSTEM AND METHOD

BACKGROUND OF INVENTION

This invention relates in general to media files delivery systems, and in particular to a system and method using multicast and unicast delivery of media files to consumers.

Live television programs may be delivered through a delivery medium such as coaxial cables, optical fibers or twisted pairs to subscribers, where the capacity is limited by the bandwidth of the delivery medium. With the introduction of high definition television programs, the increased number of channels that are offered to cable subscribers, and the development of the use of internet protocol (IP) to deliver television programs (IPTV), there is a need for increasing the efficiency in bandwidth use of the delivery medium in digital video transmission of television programs.

It is beneficial to use internet protocol (IP) multicast to deliver the television program for improved access network bandwidth efficiency. This is particularly true for live television programs for which a large number of viewers may be interested in receiving the program stream simultaneously. This may be done by delivering a video stream in multicast mode using the User Datagram Protocol (UDP) perhaps in conjunction with Real-Time Protocol (RTP). However, many client devices do not support this type of delivery and instead utilize Hypertext Transfer Protocol ("HTTP") to retrieve a sequence of media file objects from a file server. The same problem is encountered whether the live media files are delivered by means of coaxial cables in cable television, by optical fibers in internet protocol television (IPTV) systems or by twisted pairs in digital subscriber line (DSL) networks.

It is therefore desirable to provide a system and method by which such problems are alleviated.

SUMMARY OF THE INVENTION

In order to marry multicast delivery on the access network with the fragmented media file approach used by client devices, one embodiment of the invention employs a cache at a gateway device located between the client and the access network link. The cache is pre-filled, via IP multicast, with media files that it then serves preferably via HTTP to client devices. For a live television program, the media files are timed to arrive in the cache shortly before they are to be requested by the client device. Since each gateway is likely serving client devices that are interested in watching different television programs, individual television programs can be carried on separate multicast streams (multicast groups). This embodiment of the invention provides that a gateway will join the appropriate multicast group to receive the necessary media files. As there may be some delay between detecting that a new multicast group is needed by a gateway, and the gateway beginning to receive media files via the new multicast group, this embodiment utilizes a "proxy cache" function in which a client request for a media file is forwarded to an alternate server across the access network when the requested file is not resident in the cache. As a result, a client that begins requesting for media files for a new television program is not delayed in acquiring those media files while the gateway detects the need, and joins, the appropriate multicast group. As an additional benefit of this arrangement, if a particular media file is corrupted or otherwise not delivered via the IP multicast stream, the gateway will not find it in cache when a client requests, and the request will be forwarded on for retrieval from the alternate server.

The IP multicast stream of media files could be delivered using UDP. However, if a single packet were to be dropped in transit (due to congestion or channel impairment) the entire file (of which the dropped packet represented a portion) would be corrupted at all gateway devices, and would thus be discarded. The result would either be several seconds of video loss, or (more likely) a simultaneous unicast fetch of the file by each gateway device (acting as an HTTP proxy). Since each fragment file would likely be multiple megabytes, this would introduce a heavy load on the head-end server of a cable system if it occurred in the delivery of a popular channel.

In one embodiment of one aspect of the invention, this problem is solved by using an alternate file server capable of delivering media files in unicast mode to a media gateway device in response to user requests, as well as a FCAST/NORM media streamer capable of delivering a stream of these media files in multicast mode to the media gateway device. The acronym NORM as used herein stands for NACK-Oriented Reliable Multicast Transport Protocol, where the acronym NACK stands for Negative Acknowledgement. FCAST is a protocol disclosed in http://datatracker.ietf.org/doc/draft-ietf-rmt-fcast/. NORM is a protocol disclosed in http://tools.ietf.org/search/rfc5740. These two documents on NORM and FCAST are hereby incorporated herein by this reference in their entirety for all purposes. The FCAST/NORM media streamer is able to perform error correction and/or individual packet retransmission when packets are dropped in transit, so that the video loss or simultaneous unicast fetch of the file with dropped packets by multiple gateway devices can be avoided. The alternate file server may be used for media file delivery when only a few subscribers are viewing the television program, and the FCAST/NORM media streamer may be used for delivering a stream of said media files in multicast mode for popular television programs. By using a file server operating in unicast mode and a FCAST/NORM media streamer delivering a stream of these media files in multicast mode, it is possible to switch seamlessly between the two modes in an embodiment.

In an embodiment of another aspect of the invention, the file server delivers to a media gateway device media files in response to user requests when such media files have not been cached at the media gateway device; and the FCAST/NORM media streamer delivers a stream of such media files in multicast mode to the media gateway device for caching. In this manner, the file server and the FCAST/NORM media streamer operate together to efficiently deliver media files to users. When the media files requested by the user are cached at the gateway device, there is no need for the file server to deliver these files in unicast mode, and the media files delivery to the gateway device is performed by the FCAST/NORM media streamer in efficient multicast mode. However, when the media files requested by the user are not cached at the gateway device, the file server steps in to deliver such files. There is therefore no gap in media files delivery, and the switching between unicast and multicast modes will occur seamlessly in a manner transparent to the viewer.

In an embodiment of yet another aspect of the invention, a media gateway device is used for delivery of media files from a media files delivery system to a user. The media gateway device includes a cache memory for storing media files from the file server and/or the FCAST/NORM media streamer; and a controller that controls delivery of media files from the cache memory to the user and transmits user requests for media files to the file server when the cache memory does not contain the media files requested by the user. Thus, the controller requests media files from the file server only when the media files requested by the user are not cached. Otherwise, the media files requested by the user are fetched from the cache memory for delivery to the user. In this manner, the media files requested by the user will be delivered by the file server in unicast mode only when the FCAST/NORM media streamer has not supplied such files to the gateway device for caching.

All patents, patent applications, articles, books, specifications, other publications, protocols, standards, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 1 is a block diagram of a media file delivery system to illustrate one embodiment of the invention.

FIG. 2A is a flow chart illustrating functions and operations of the FCAST/NORM media streamer 16 of FIG. 1 in sending media files and FIG. 2B is a flow chart illustrating functions and operations of a FCAST receiver function in controller 24b at the media gateway 24 of FIG. 1 receiving the media files.

DETAILED DESCRIPTION OF EXEMPLARY EMBODIMENTS

Figure 3:
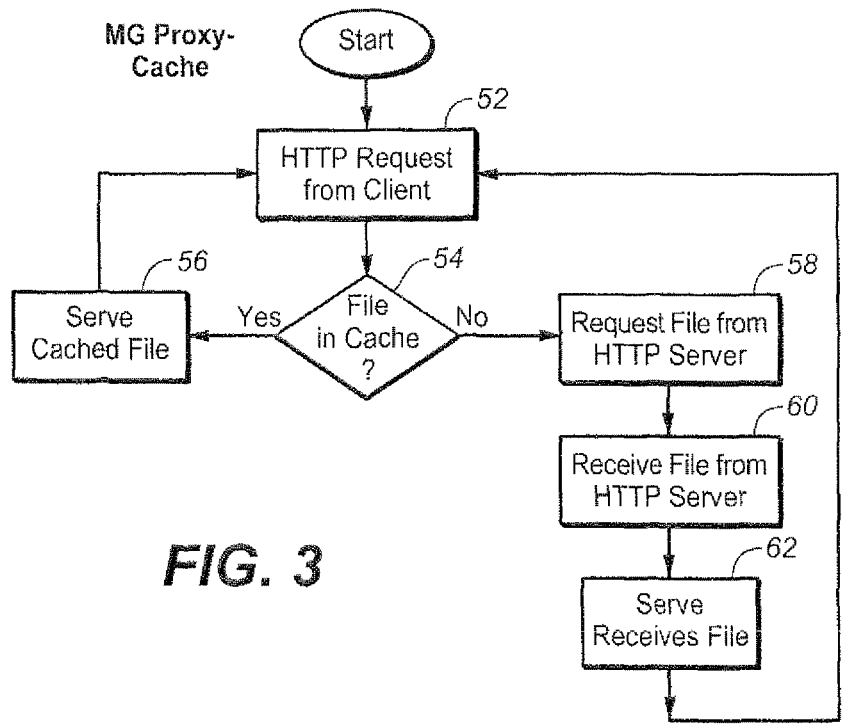
FIG. 3 is a flow chart illustrating functions and proxy-cache operations of the media gateway illustrating functions and operations of the system of FIG. 1.

FIG. 1 is a block diagram of a media file delivery system 10 to illustrate one embodiment of the invention. Media files such as live television programs are sent from content ingest network 12 to a file server 14 and a FCAST/NORM media streamer 16. File server 14 employs a protocol such as preferably the Hypertext Transfer Protocol (HTTP) although other alternative protocols can be used instead. File server 14 sends the media files in data packets from network 12 in unicast mode to media gateway device 24 through a termination device 22 such as a cable modem termination system (CMTS) of a cable television system or an optical line terminal of a passive optical network (PON) through a multicast-enabled IP network 25. FCAST/NORM media streamer 16 sends a stream of media file data packets to media gateway device 24 through a termination device 22. FCAST/NORM media streamer 16 may be controlled to multicast selected programs to a number of gateway devices. File server 14 and FCAST/NORM media streamer 16 may be located in a headend in the case of a cable television system, or in a central office in the case of a PON network.

The functionalities of file server 14 and of the FCAST/NORM media streamer 16 may be implemented as software in one or more computer systems, or as firmware or hardware, or a combination of the above. Where these functionalities of file server 14 and of the FCAST/NORM media streamer 16 are implemented as software in one or more computer systems, the computer system(s) can be specialized machines for carrying out these functions.

Media gateway device 24 comprises a modem 24a (such as a cable modem in the case of a cable television system) for receiving the media file packets from the termination device 22, through a transmission medium 26 such as coaxial cables, optical fibers or twisted pairs. The media file packets received by modem 24a are sent to and processed by a controller 24b and cached at a cache memory 24c under the control of controller 24b. The media file packets cached at cache memory 24c are sent under the control of controller 24b to a client device 28 such as a computer, television, personal digital assistant, notebook or tablet computer or cellular phone. Preferably controller 24b sends the media file packets to the client device 28 by means of HTTP.

FIG. 2A is a flow chart illustrating functions and operations of the FCAST/NORM media streamer 16 in sending media files and FIG. 2B is a flow chart illustrating functions and operations of a FCAST receiver function in controller 24b at the media gateway 24 receiving the media files. When a new media file arrives at the streamer 16 (block 32), the streamer forms a FCAST packet header (block 34) containing metadata about the media file, prepends (block 36) header formed to the media file to preferably form a compound object, and sends (block 38), using the NORM protocol, the compound object so formed to the gateway device 24, as well as to other gateway device of similar construction in multicast mode. This process is then repeated for other media files received from network 12 to send a stream of the compound objects to the gateway device 24. The NORM functionality will enable dropped packets to be retrieved without the gateway device 24 having to try to fetch files containing dropped packets from the file server 14. The functionalities of the FCAST receiver in controller 24b at the media gateway may be implemented as software, or as firmware or hardware, or a combination of the above.

Controller 24b in device 24 receives (block 40) the stream of the compound objects, parses (block 42) the header of the objects and stores (block 44) the data in the objects in cache memory 24c. Controller 24b in device 24 performs a similar operation when the media file packets are received through network 25, termination device 22 and medium 26 from the file server 14 instead. In this event, the data in the packets are also stored, preferably in cache memory 24c, although the packets so received need not be in the form of compound objects.

FIG. 3 is a flow chart illustrating functions and proxy-cache operations of the media gateway 24. When the gateway device receives (Block 52) a user request (preferably using HTTP) from client device 28 for a media file, controller 24b will try to find and fetch (Diamond 54) this file from cache memory 24c. If the file is found, then the controller will cause the router 24d to send (Block 56) the file to the client 28. If the file is not found, then the controller will send (Block 58) a request for this file to the file server 14 through medium 26, termination device 22 and network 25. When this file is received (Block 60) from file server 14, it is sent (Block 62) to client 28. This process is repeated for all user requests received by device 24.

Figure 4:
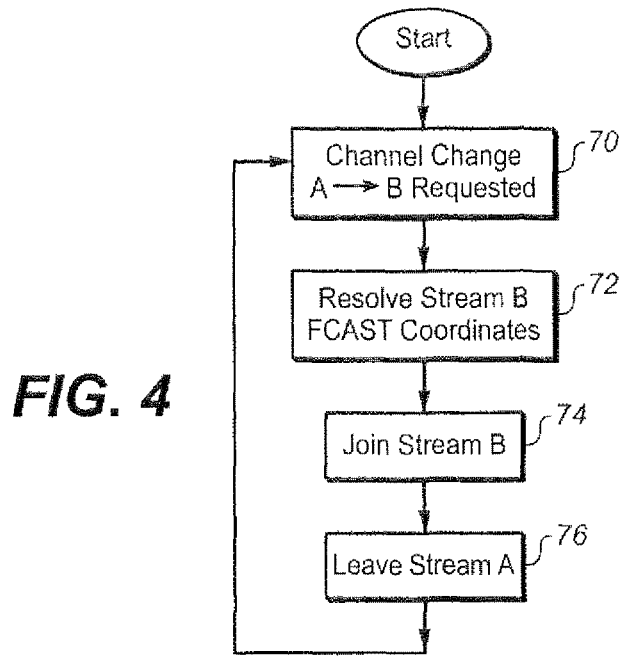
FIG. 4 is a flow chart illustrating channel switching by a user illustrating functions and operations of the system of FIG. 1.

FIG. 4 is a flow chart illustrating channel switching by a user. Where live programs are delivered as video streams A and B by the FCAST/NORM media streamer 16, for example, the user may have tuned in to stream A but not stream B. In such event, when the user selects (70) to view the live program delivered as video stream B instead of the live program delivered as video stream A, controller 24b in gateway 24 will resolve (72) the multicast group upon which video stream B is delivered via FCAST/NORM, send (74) a message such as an IGMP Membership Report to the termination device 22 or other appropriate element in the multicast-enabled network 25 to inform the network that it wishes to receive stream B, and send (76) a message such as an IGMP Leave Group to the termination device 22 or other appropriate element in multicast-enabled IP network 25 to inform the network that it no longer wishes to receive stream A. The termination device 22, in conjunction with the multicast-enabled IP network (25) then ensure that the gateway 24 begins receiving stream B and ceases to receive stream B. The gateway 24 could resolve (72) the multicast group by employing a look-up table or by other means. The acronym IGMP as used herein refers to the Internet Group Management Protocol disclosed in http://tools.ietf.org/search/rfc3376. This document on IGMP is hereby incorporated herein by this reference in its entirety for all purposes.

Figure 5:
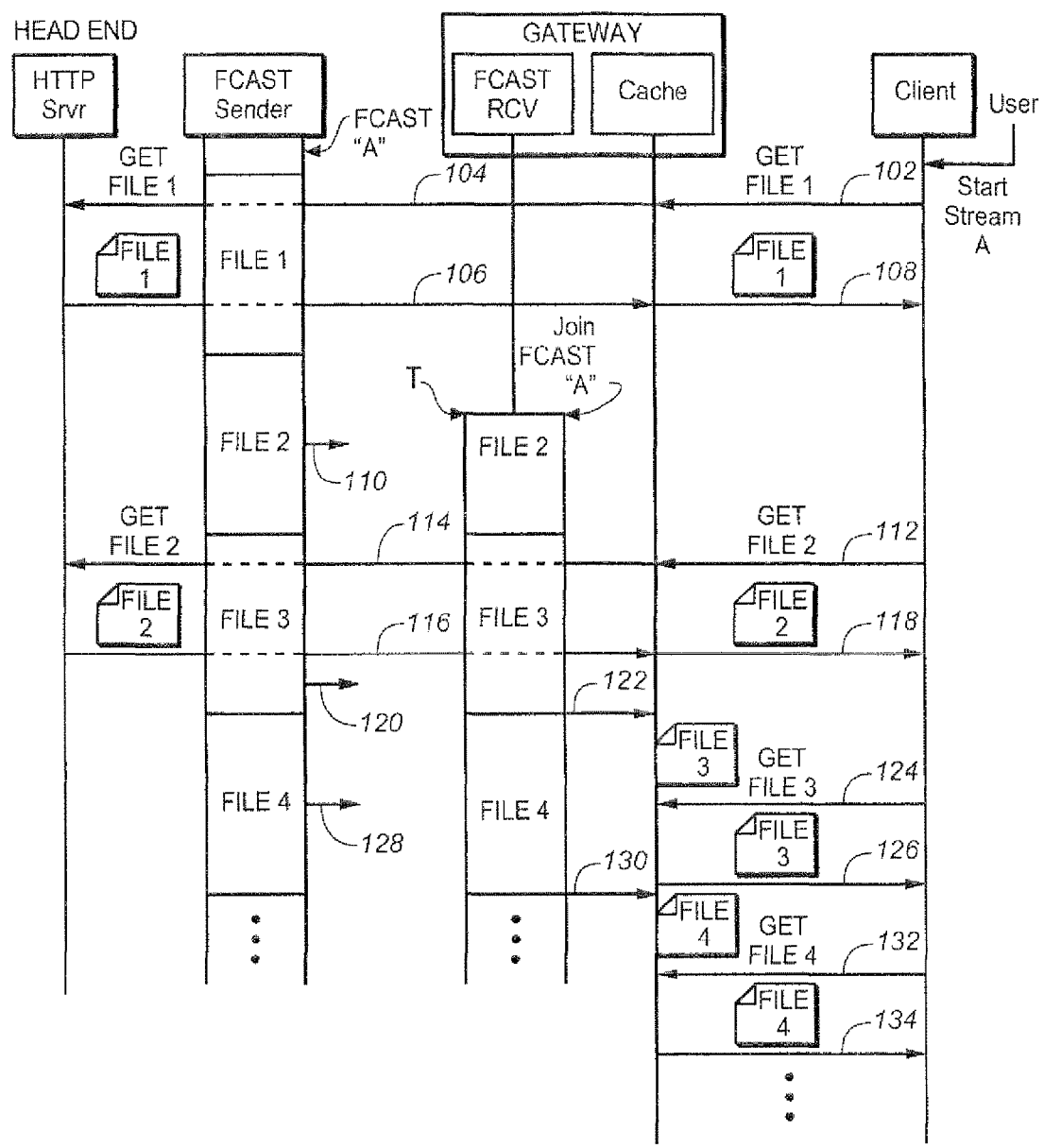
FIG. 5 is a protocol diagram illustrating functions and operations of the system of FIG. 1.

FIG. 5 is a protocol diagram illustrating functions and operations of the system of FIG. 1. The user may have just turned on client device 28, or has selected to switch from another channel to the live program delivered as video stream A. When the user is not already watching the live program that is being delivered as stream A, and the user selects to do so, the client device 28 will send a request for file 1 in the stream A, "get file 1," to the gateway 24 (arrow 102). Assuming that stream A is not delivered to gateway 24 by the FCAST/NORM media streamer 16 at the time of the user's request, file 1 will not be cached in the cache memory 24c at the gateway 24. Hence the controller 24b in gateway 24 will transmit this request "get file 1" to the file server 14 (arrow 104) as explained above in reference to FIG. 3. In response, the file server 14 transmits file 1 to the gateway 24 (arrow 106), where the file 1 is stored in cache memory 24c. The controller 24b in gateway 24 will transmit file 1 stored in cache memory 24c to the client device 28 preferably using HTTP (arrow 108). In reference to FIG. 4, this request from the user for file 1 of stream A will also trigger the gateway 24 to join the stream A multicast group being sent by the FCAST/NORM media streamer 16, so that after a certain amount of delay, the gateway will start to receive file 2 at time T in stream A. It happens that time T is such that only a portion of file 2 is delivered to the gateway (arrow 110). Controller 24b examines the compound object containing file 2 in cache memory 24c and discovers that only a portion of the file 2 is received, and so the incomplete portion is discarded. The FCAST/NORM media streamer 16 will continue to deliver to gateway 24 the files in stream A that follow, that is, file 3, file 4 and so on, even without receiving any further user requests.

Hence, when a user request for file 2 of stream A is received (arrow 112), controller 24b will still transmit this request "get file 2" to the file server 14 (arrow 114), since cache memory does not contain file 2. File 2 is returned (arrow 116) by file server 14 to the gateway 24, which is served to client 28 after being stored in cache memory 24c (arrow 118). Meanwhile the FCAST/NORM media streamer 16 delivers file 3 to gateway (arrow 120). This is received at the FCAST receiver function in controller 24b, and is stored (arrow 122) in cache memory 24c. When a user request for file 3 of stream A is received (arrow 124), controller 24b finds this file in the cache memory and serves the client 28 with this file (arrow 126), without sending the request to file server 14. Meanwhile the FCAST/NORM media streamer 16 delivers file 4 to gateway (arrow 128). This is received at the FCAST receiver function in controller 24b, and is stored (arrow 130) in cache memory 24c. When a user request for file 4 of stream A is received (arrow 132), controller 24b finds this file in the cache memory and serves the client 28 with this file (arrow 134). This process then continues until the user chooses to switch to another media file stream, or terminates viewing of media file streams.

As noted above, when the FCAST/NORM media streamer 16 delivers a stream of said media files in multicast mode to the media gateway device, the file server 14 will no longer or will cease to receive user requests for said media files to be received in unicast mode at the media gateway device after at least some of said media files have been cached at the media gateway device. In some systems, there may be a limit as to how many multicast media file streams the FCAST/NORM media streamer 16 can handle at any one time. Hence, when this limit is exceeded, it may be necessary to stop sending a particular stream of media files, such as one that is less viewed than others. In such event, the gateway will find that the media files requested by the user are no longer cached at the cache memory 24c, so that the controller 24b will resume transmitting these requests to the file server 14, and server 14 will serve the requested files to the gateway 24. In the event that the multicast stream is interrupted for still other reasons (i.e. other than the limit being reached), so that the media files requested by the user are no longer cached at the cache memory 24c, the controller 24b will resume transmitting these requests to the file server 14, and server 14 will fetch and serve the requested files to the gateway 24. All this will happen automatically thereby switching from multicast mode to unicast mode seamlessly in a manner transparent to the viewer.

While the invention has been described above by reference to various embodiments, it will be understood that changes and modifications may be made without departing from the scope of the invention, which is to be defined only by the appended claims and their equivalents. For example, the various aspects described above may be applied to the delivery of media programs other than live television programs, such as video on demand. While the embodiments above refer to cable or PON networks, the various aspects described above may be applied to the delivery of media programs through copper twisted pairs in DSL networks.

What is claimed is:

1. A media files delivery computer system, comprising:
a media gateway device;
a file server capable of delivering one or more media files in unicast mode to the media gateway device in response to one or more user requests;
a FCAST/NORM media streamer capable of delivering a stream of said media files in multicast mode to the media gateway device; and,
wherein said FCAST/NORM media streamer delivers a stream of said media files in multicast mode to the media gateway device, and said media gateway device stops sending to the file server user requests for said media files to be received in unicast mode at the media gateway device after at least some of said media files have been cached at the media gateway device, and
wherein when said FCAST/NORM media streamer ceases to deliver a stream of said media files in multicast mode, said media gateway device resumes sending user requests to the file server for said media files to be delivered in unicast mode.

2. The system of claim 1, wherein said FCAST/NORM media streamer ceases to deliver a stream of said media files in multicast mode when a predetermined number of media file streams has been exceeded.

3. The system of claim 1, wherein said file server resumes delivering in unicast mode said media files requested by the user.

4. The system of claim 1, wherein said file server employs Hypertext Transfer Protocol for media file delivery.

5. The system of claim 1, additionally comprising a network termination device wherein said network termination device includes a cable modem termination system or an optical line terminal.

6. The system of claim 1, further comprising a coaxial cable, an optical fiber or copper twisted pair for delivery of said media files.

7. The system of claim 1, wherein said file server and said FCAST/NORM media streamer are components of a cable television headend, or of a passive optical network central office.

8. A method for delivery of media files, employing a media files delivery computer system, comprising:
- a file server delivering one or more media files in unicast mode to a media gateway device in response to one or more user requests;
- a FCAST/NORM media streamer delivering a stream of said media files in multicast mode to the media gateway device, said method comprising:
- the file server delivering to the media gateway device media files in response to one or more user requests when such media files have not been cached at the media gateway device; and
- the FCAST/NORM media streamer delivering a stream of such media files in multicast mode to the media gateway device, wherein said media gateway device stops sending to the file server user requests for said media files to be received in unicast mode at the media gateway device after at least some of said media files have been cached at the media gateway device, and
- wherein when said FCAST/NORM media streamer ceases to deliver a stream of said media files in multicast mode, said media gateway device resumes sending user requests to the file server for said media files to be delivered in unicast mode.

9. The method of claim 8, wherein said FCAST/NORM media streamer ceases to deliver a stream of said media files in multicast mode when a predetermined number of media file streams has been exceeded.

10. The method of claim 8, wherein said file server resumes delivering in unicast mode said media files requested by the user.

11. The method of claim 8, wherein said file server employs Hypertext Transfer Protocol for media file delivery.

12. A media files delivery computer system, comprising:
- a media gateway device;
- a file server capable of delivering one or more media files in unicast mode to the media gateway device in response to one or more user requests;
- a FCAST/NORM media streamer capable of delivering a stream of said media files in multicast mode to the media gateway device; and
- wherein said FCAST/NORM media streamer delivers a stream of said media files in multicast mode to the media gateway device, and said media gateway device stops sending to the file server user requests for said media files to be received in unicast mode at the media gateway device after at least some of said media files have been cached at the media gateway device.

* * * * *